US009292825B2

(12) United States Patent
Chan et al.

(10) Patent No.: US 9,292,825 B2
(45) Date of Patent: Mar. 22, 2016

(54) MULTI-TIER INVENTORY VISIBILITY

(75) Inventors: Victor Chan, Thornhill (CA); Mark W. Hubbard, Maple (CA); Aalim Lakhani, Toronto (CA); Daisy Tan, Toronto (CA); Fen Wang, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 11/428,607

(22) Filed: Jul. 5, 2006

(65) Prior Publication Data
US 2008/0010170 A1  Jan. 10, 2008

(51) Int. Cl.
G06Q 10/00 (2012.01)
G06Q 10/08 (2012.01)

(52) U.S. Cl.
CPC ................. *G06Q 10/087* (2013.01)

(58) Field of Classification Search
USPC .......................................................... 705/28
See application file for complete search history.

(56) References Cited

U.S. PATENT DOCUMENTS

| 5,581,461 | A | | 12/1996 | Coll et al. |
| 5,606,693 | A | * | 2/1997 | Nilsen et al. ............... 707/10 |
| 6,343,275 | B1 | * | 1/2002 | Wong ............ G06Q 10/0633 705/1.1 |
| 6,782,350 | B1 | * | 8/2004 | Burnley et al. ............ 702/186 |
| 7,188,170 | B1 | * | 3/2007 | Burnley et al. ............ 709/224 |
| 7,216,096 | B1 | * | 5/2007 | Untiedt et al. ............. 705/28 |
| 7,257,552 | B1 | * | 8/2007 | Franco ....................... 705/28 |
| 7,376,600 | B1 | * | 5/2008 | Wadawadigi ...... G06Q 10/087 705/26.4 |
| 2002/0049622 | A1 | * | 4/2002 | Lettich ............... G06Q 10/08 705/7.11 |
| 2002/0095307 | A1 | | 7/2002 | Greamo et al. |
| 2002/0095457 | A1 | * | 7/2002 | Sharma ............... G06Q 10/06 709/203 |
| 2002/0138316 | A1 | * | 9/2002 | Katz ............ G06Q 10/06311 705/7.13 |
| 2002/0138317 | A1 | * | 9/2002 | Mok ................... G06Q 10/06 700/44 |
| 2003/0110104 | A1 | * | 6/2003 | King et al. .................. 705/28 |
| 2003/0208417 | A1 | * | 11/2003 | Heinrichs et al. ........... 705/28 |
| 2003/0208418 | A1 | * | 11/2003 | Caputo et al. ............... 705/28 |
| 2004/0153359 | A1 | * | 8/2004 | Ho ...................... G06Q 10/06 705/7.25 |
| 2005/0125313 | A1 | * | 6/2005 | Untiedt ................ G06Q 10/087 705/28 |
| 2005/0261928 | A1 | * | 11/2005 | Skeadas ............... G06Q 30/02 705/346 |
| 2006/0149637 | A1 | * | 7/2006 | Zellner ............... G06Q 10/087 705/14.23 |
| 2006/0195563 | A1 | * | 8/2006 | Chapin et al. ............ 709/223 |
| 2006/0235768 | A1 | * | 10/2006 | Tatum et al. ............... 705/28 |

(Continued)

FOREIGN PATENT DOCUMENTS

WO    WO 02080049 A1 * 10/2002 ............. G06F 17/60
WO    WO 03/036423 A2    5/2003

OTHER PUBLICATIONS

Kleinman, Ron, 1×Retail Infrastructure Study; Oct. 23, 2000.

*Primary Examiner* — Ashford S Hayles
(74) *Attorney, Agent, or Firm* — Steven M. Greenberg, Esq.; CRGO Law

(57) ABSTRACT

Embodiments of the present invention address deficiencies of the art in respect to inventory management and provide a method, system and computer program product for multi-tier inventory visibility. In one embodiment of the invention, a multi-tier inventory management data processing system can include an inventory management system coupled to one or more e-commerce applications over an enterprise bus, and multiple different instances of a tier inventory component, each of the instances corresponding to a local inventory cache. Each instance can include program code enabled to manage the local inventory cache and an inventory management API exposing inventory operations on the local inventory cache to other instances of the tier inventory component.

16 Claims, 3 Drawing Sheets

(56) References Cited

U.S. PATENT DOCUMENTS

| | | | |
|---|---|---|---|
| 2007/0043602 A1* | 2/2007 | Ettl | G06Q 10/06311 705/7.13 |
| 2007/0124217 A1* | 5/2007 | Terry et al. | 705/28 |
| 2007/0174146 A1* | 7/2007 | Tamarkin | G06Q 10/087 705/28 |
| 2009/0259527 A1* | 10/2009 | Yang | G06Q 10/06 705/28 |
| 2009/0276293 A1* | 11/2009 | Zellner | G06Q 10/087 705/14.4 |
| 2012/0017082 A1* | 1/2012 | Davies | G06Q 10/06 713/156 |
| 2013/0238382 A1* | 9/2013 | Schierholt | G06Q 10/0631 705/7.25 |

* cited by examiner

MULTI-TIER INVENTORY VISIBILITY

BACKGROUND OF THE INVENTION

1. Field of the Invention

The present invention relates to the field of e-commerce systems and more particularly to the field of inventory management in an e-commerce system.

2. Description of the Related Art

E-commerce systems have evolved to provide virtual storefronts whose operational capabilities far exceed those of the traditional, brick and mortar store. Whereas in the brick and mortar store, each of the sales, marketing, order fulfillment, inventory, and customer service functions remain the separate responsibilities of corresponding business roles, in a well-defined e-commerce system, each of the sales, marketing, order fulfillment, inventory and customer service can be integrated in a single computing system in a highly automated fashion. Consequently, a more optimal business operation can result in which data flows between different functional subsystems seamlessly to facilitate the daily conduct of business managed by the e-commerce system.

In the prototypical e-commerce system, an on-line catalog of available goods and/or services for sale can be established along with associated pricing. Customers can be provided with a store front user interface through which customers can browse the on-line catalog. When a customer desires to purchase a product or service, the customer can so indicate causing the addition of the selected product or service to an on-line shopping cart, though it is also known to bypass the shopping cart model in favor of direct purchase model.

Inventory management supports order capture, payment and catalog management in an e-commerce system. Inventory management refers to the accounting and management of product inventory on-hand and available for allocation to a customer. As such, inventory management can be a critical aspect of order capture in that inventory must be available for shipment to customers. Likewise, inventory management can be a critical aspect of payment processing as payment can be processed for a purchase only when inventory is allocated to a customer.

In many e-commerce systems, each of the order entry, catalog navigation and payment processing sub-systems are preferred to be separate in nature. In some systems, each different sub-system can be developed separately by different developers in different firms. Furthermore, each separate sub-system can execute independently of the other. In consequence, maintaining access to a common inventory management system can require a high degree of coordination among the sub-systems of the e-commerce system. Where the coordination falls short, incompatibilities can arise between the different sub-systems and the inventory management system.

Inventory management systems, in of themselves, vary in functionality and strategy. For instance, in an "available to promise" (ATP) based inventory system, inventory reporting can include not only inventory on hand, but also inventory expected to be on hand. In this regard, inventory on hand can be classified as allocated or non-allocated, whereas anticipated inventory which has been allocated can be classified as backordered. By comparison, in a non-ATP based inventory system, only inventory on hand can be reported to coupled components of an e-commerce system so as to guarantee inventory for orders on a first come, first served basis.

Inventory management systems fare well in a unified and centrally controlled environment where inventory is managed from a central location that can be accessed by requesting sub-systems throughout the enterprise. Modern e-commerce systems, however, do not always provide for a centrally controlled environment, nor do modern e-commerce systems provide for an "always on, always connected" environment. Rather, in certain circumstances, portions of the enterprise can operate in a disconnected, remote mode in the absence of real-time access to a central repository of inventory information.

In fact, in the more prevalent circumstance, different portions of the enterprise can incorporate different inventory management systems that, in the absence of a high degree of integration, can act in a de facto disconnected mode. Specifically, some e-commerce environments stitch together disparate inventory management systems for different sales channels, different sales regions, and different stores. In the absence of a unified view of inventory, important e-commerce features such as ordering in one store and allocating inventory from another store cannot be supported.

BRIEF SUMMARY OF THE INVENTION

Embodiments of the present invention address deficiencies of the art in respect to inventory management and provide a novel and non-obvious method, system and apparatus for multi-tier inventory visibility. In one embodiment of the invention, a multi-tier inventory management data processing system can be provided. The system can include an inventory management system coupled to one or more e-commerce applications over an enterprise bus, and multiple different instances of a tier inventory component, each of the instances corresponding to a local inventory cache.

Each instance of the tier inventory component can include program code enabled to manage the local inventory cache. Each instance further can include an inventory management application programming interface (API) exposing inventory operations on the local inventory cache to other instances of the tier inventory component. Each instance of the tier inventory component yet further can include an event manager for the local inventory cache, and inventory management rules specifying priming and management for the local inventory cache. Finally, each instance of the tier inventory component can include an outbound messaging adapter coupled to the event manager and enabled to request inventory operations on other instances of the tier inventory component.

In one embodiment of the invention, the instances of the tier inventory component can be arranged hierarchically. As such, the system further can include propagation rules specifying propagation of inventory data from the local inventory cache to other local inventory caches for other instances of the tier inventory component at lower hierarchical levels. In this way, different portions of the enterprise data processing system need not maintain a constant communicative linkage to a centralized inventory management system. Rather, the different portions of the enterprise data processing system can access inventory data offline in respective local inventory caches.

In another embodiment of the invention, a multi-tier inventory management method can be provided. The method can include priming a local inventory cache with a subset of inventory data for an enterprise data processing system and exposing access to the local inventory cache through an inventory management API. Thereafter, the method can include requesting inventory operations on a different local inventory cache through an API for the different local inventory cache. The operations can include, for example, an inventory lookup operation and a inventory reservation operation. Likewise, the method can include propagating changes in the local inventory cache to another local inventory cache.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for multi-tier inventory visibility. In accordance with an embodiment of the present invention, different portions of an e-commerce enterprise data processing system can be configured with a tier inventory component. The tier inventory component can include a local cache of inventory data determined according to a cache population policy. The tier inventory component further can include an inventory API providing access to the inventory data in the local inventory cache. In this way, other tier inventory components in the data processing system can access the inventory data in the local cache directly without relying upon a centralized inventory repository. Possible tier-to-tier operations include inventory lookups and inventory reservations.

Figure 1:
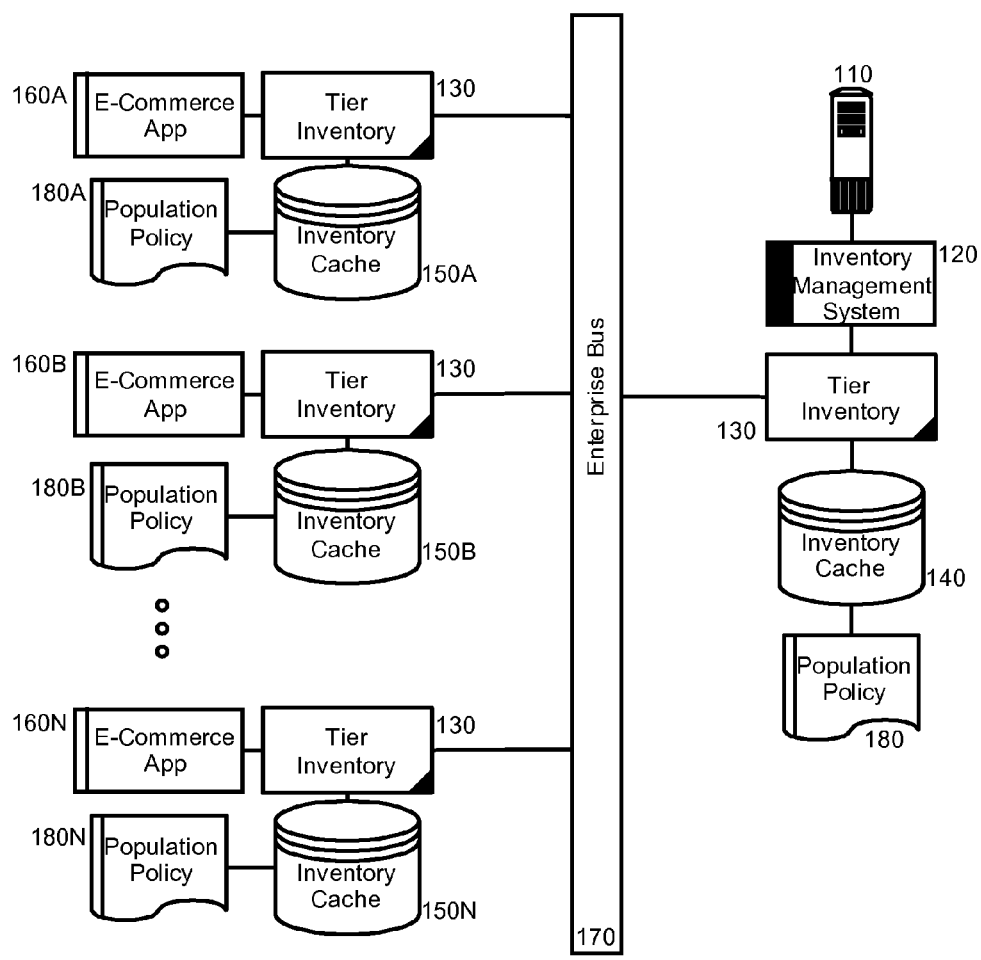
FIG. 1 is a schematic illustration of an e-commerce enterprise data processing system configured for multi-tier inventory visibility.

In further illustration, FIG. 1 is a schematic illustration of an e-commerce enterprise data processing system configured for multi-tier inventory visibility. The system can include one or more e-commerce applications 160A, 160B, 160N communicatively coupled over an enterprise bus 170 to an enterprise inventory management system 120 disposed in an enterprise host 110. Each e-commerce application 160A, 160B, 160N can serve a particular store whether virtual or physical, a group of stores, a region, a sales channel, or any other retail subdivision.

The inventory management system 120 can provide logic including program code enabled to manage inventory globally for the entire enterprise data processing system, for a particular region, a set of retail outlets, or a single warehouse, to name only a few. Notably, though not illustrated particularly, multiple different heterogeneous instances of the inventory management system 120 can operate in the enterprise host 110 or within another host. Importantly, an instance of a tier inventory logical component 130 can be coupled to the inventory management system 120. Likewise, an instance of a tier inventory logical component 130 can be coupled to each of the e-commerce applications 160A, 160B, 160N.

Each instance of the tier inventory logical component 130 can be coupled to a local inventory cache 140, 150A, 150B, 150N. Each local inventory cache 140, 150A, 150B, 150N can include a subset of inventory for the enterprise data processing system. The selection of inventory data maintained in a local inventory cache 140, 150A, 150B, 150N can depend upon a corresponding population policy 180, 180A, 180B, 180N. The population policy 180, 180A, 180B, 180N can define whether the local inventory cache 150A, 150B, 150N is to store inventory data only for a corresponding e-commerce application 160A, 160B, 160N, for several of the e-commerce applications 160A, 160B, 160N, or for the entire enterprise data processing system.

The tier inventory component 130 can include an API providing access to inventory operations on a coupled inventory cache 150A, 150B, 150N, including inventory lookups and inventory reservations. To account for the heterogeneous nature of different ones of the e-commerce applications, the API can conform to a standardized API such as the International Extensible Markup Language (XML) Retail Cooperative (IXRetal) specification defined by the Association of Retail Technology Standards (ARTS) or the Open Applications Group Integration Specification (OAGIS) defined by the Open Applications Group. To seek inventory data across a the nested arrangement of the inventory caches 150A, 150B, 150N, the tier inventory component 130 further can include one or more message adapters enabled to request inventory operations from coupled instances of the tier inventory component 130 for other ones of the e-commerce application 160A, 160B, 160N.

Figure 2A:
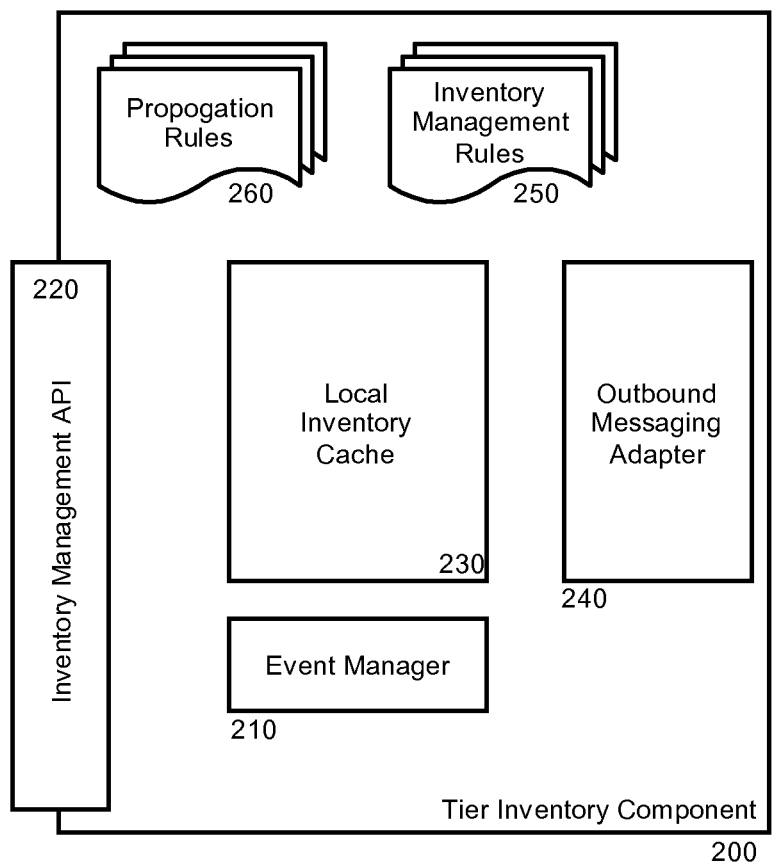
FIG. 2A is a block diagram of a tier inventory component enabled for multi-tier inventory visibility.

In more particular illustration, FIG. 2A is a block diagram of a tier inventory component enabled for multi-tier inventory visibility. As shown in FIG. 2A, a tier inventory component 200 can be coupled to a local inventory cache 230 and can provide an inventory management API 220 to the local inventory cache 230. An event manager 210 can be provided to determine when and how to manage the local inventory cache. Examples include triggering inventory management operations based upon inventory triggers such as reservation, over-allocation, under-allocation, re-order points and the like. The management decision making of the event manager 210 can be driven by one or more inventory management rules 250 specifying the priming of the local inventory cache 230 and one or more inventory management actions for corresponding events detected by the events manager 210.

An outbound messaging adapter 240 further can be provided in connection with the tier inventory component 200. The outbound messaging adapter 240 can be enabled to forward messages to other instances of the tier inventory component 200 in order to perform inventory operations in the local inventory caches of the other instances. The outbound messaging adapter 240 further can be enabled to receive inventory data resulting from one or more inventory operations requested of other instances of the tier inventory component 200. In this way, a multi-tier hierarchy of instances of the tier inventory component 200 can be established to provide inventory visibility for a wide range of an enterprise data processing system without further requiring the use of a centralized, homogenous inventory management system.

Finally, one or more propagation rules 260 can be provided for the tier inventory component 200. The propagation rules 260 can specify a filter and frequency for propagating current inventory information in the local inventory cache 230 to other instances of the tier inventory component 200. Generally, in a hierarchical arrangement of instances of the tier inventory component 200, instances at higher levels in the hierarchy can propagate inventory information downwards to lower levels of the hierarchy according to the propagation rules at each node in the hierarchy. In this way, the degree of visibility provided for the inventory of the enterprise data processing system can be moderated granularly by the propagation rules 260 of each node.

Figure 2B:
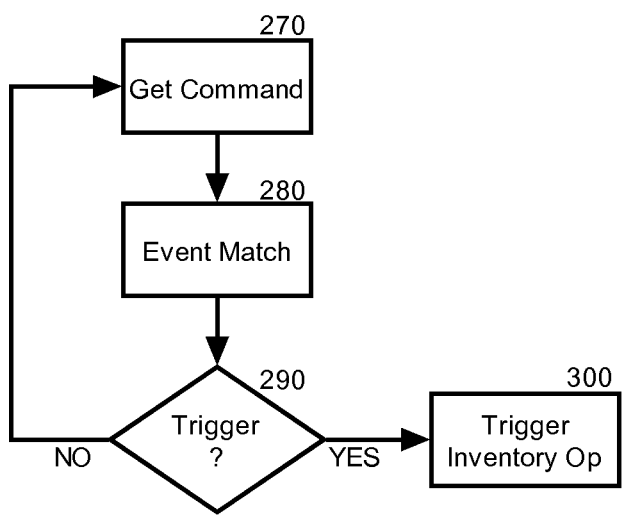
FIG. 2B is a flow chart illustrating a process for multi-tier inventory visibility.

In operation, the local inventory cache 230 can be primed according to the inventory management rules 250 and rendered accessible through the inventory management API 220. Inventory operations can be performed on the local inventory cache 230 as specified by the event manager 210. Specifically, referring to FIG. 2B, commands can be received in block 270 and an event can be matched to the command in block 280. In decision block 290, if the event maps to an inventory operation, in block 300 the inventory operation can be triggered.

Figure 3:
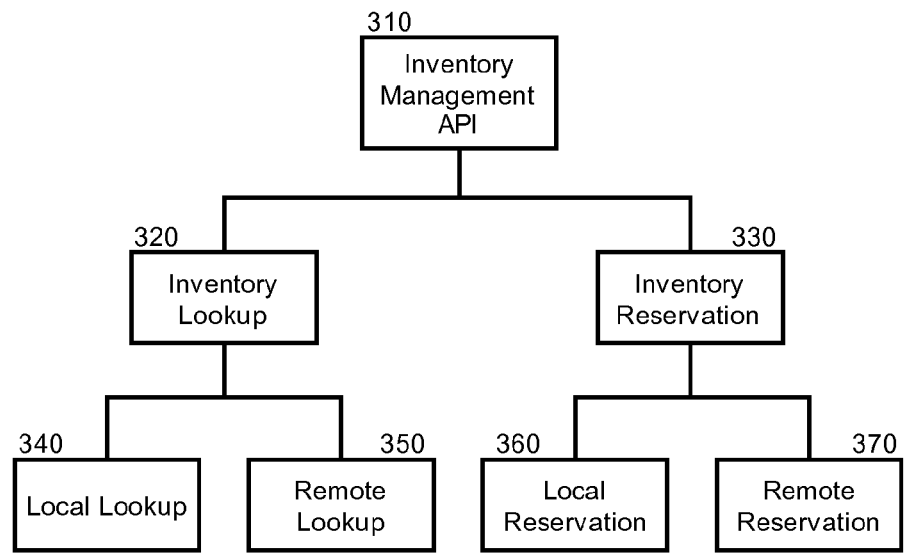
FIG. 3 is a hierarchical function diagram of the tier inventory component of FIG. 2A; and, FIG. 4 is a schematic illustration of a nested arrangement of tiered inventory components coupled to multiple inventory management systems in the e-commerce enterprise data processing system of FIG. 1.

In yet further illustration, referring to FIG. 3, an inventory management API 310 can provide access to a selection of inventory operations including an inventory lookup operation 320 and an inventory reservation operation 330. Each of the operations 320, 330 can be further decomposed into local and remote forms 340, 350, 360, 370 of the operations 320, 330. In the local forms 340, 360, the operations can be performed directly on the local inventory cache, whereas in the remote forms 350, 370, the operations can be performed remotely on a local inventory cache of a remote instance of a tier inventory component, or even on an instance of a tier inventory component coupled to a central enterprise inventory management system. For inventory lookup operations, the difference lies in the request by the outbound messaging adapter seeking an inventory lookup from a coupled instance of the tier inventory component. For inventory reservation operations, the difference can be more complex as future inventory can be accounted for in each local inventory cache for each instance of the tier inventory component.

Figure 4:
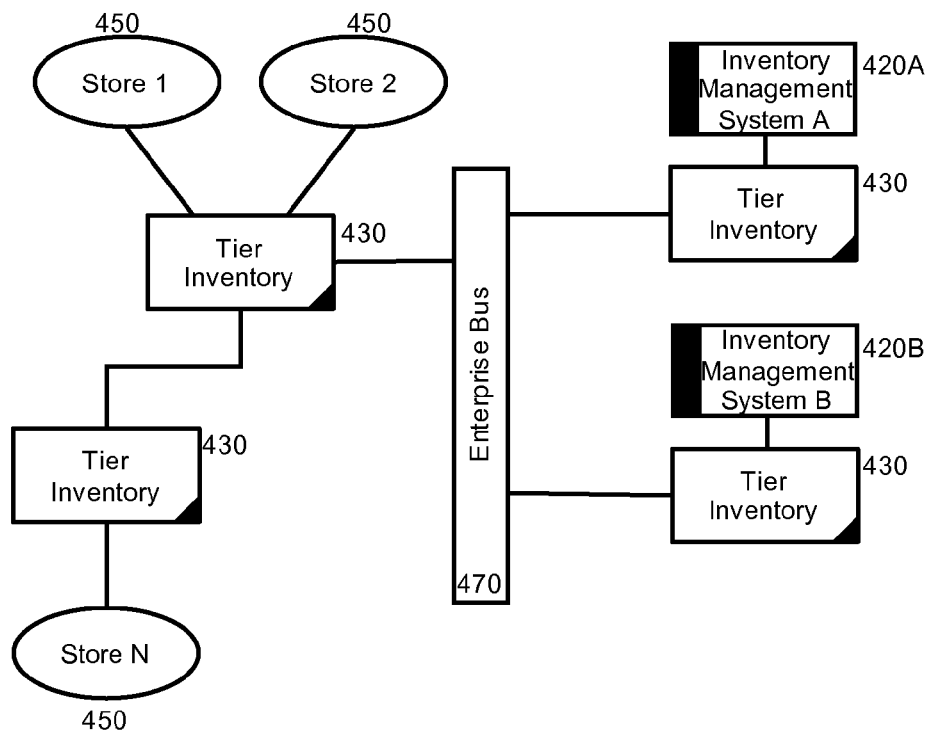

Finally, it is to be understood that multiple instances of the tier inventory component can be hierarchically arranged so that inventory changes at higher levels of the hierarchy can propagate selectively to lower levels of the hierarchy. As an example, FIG. 4 is a schematic illustration of a nested arrangement of tiered inventory components coupled to multiple inventory management systems in the e-commerce enterprise data processing system of FIG. 1. As shown in FIG. 4, different stores 450 can be coupled to different instances of the tier inventory component 430 in a hierarchy of instance of the tier inventory component 430.

Notably, multiple stores 450 can be coupled to a single tier inventory component 430. Likewise, multiple, different inventory management systems 420A, 420B can be coupled to instances of the tier inventory component 430 such that any one node in the hierarchy can access inventory data in the enterprise data processing system over the enterprise bus 470 irrespective of the diversity of types of inventory management systems 420A, 420B.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A multi-tier inventory management data processing system comprising:
   an inventory management system executing in memory of a computing system and coupled to one or more e-commerce applications over an enterprise bus; and,
   a plurality of instances of a single tier inventory component, each of the instances corresponding to a different local inventory cache from amongst a plurality of local inventory caches, each instance of the tier inventory component comprising program code enabled upon execution in memory of a computer to prime a corresponding one of the local inventory caches with a subset of inventory data for the inventory management system, to manage a correspondingly different local inventory cache, each instance further comprising an inventory management application programming interface (API) exposing for access by other instances of the tier inventory component, a selection of inventory operations on the correspondingly different local inventory cache, the operations being defined within the program code of the instance of the tier inventory component.

2. The system of claim 1, wherein the inventory management system is coupled to and rendered accessible by an instance of the tier inventory component.

3. The system of claim 1, wherein each instance of the tier inventory component further comprises:
   an event manager for the local inventory cache; and,
   inventory management rules specifying priming and management for the local inventory cache.

4. The system of claim 3, further comprising an outbound messaging adapter coupled to the event manager and enabled to request inventory operations on other instances of the tier inventory component.

5. The system of claim 1, wherein the instances of the tier inventory component are arranged hierarchically.

6. The system of claim 5, further comprising propagation rules specifying propagation of inventory data from the local inventory cache to other local inventory caches for other instances of the tier inventory component at lower hierarchical levels.

7. The system of claim 1, wherein the inventory operations comprise operations selected from the group consisting of an inventory lookup and an inventory reservation.

8. The system of claim 1, wherein the inventory operations comprises operations selected from the group consisting of local and remote operations.

9. A multi-tier inventory management method comprising:
priming a local inventory cache for a corresponding instance from among several instances of a single tier inventory component, with a subset of inventory data for an enterprise data processing system;
exposing different programmatic functions of an inventory management application programming interface (API) for the primed local inventory cache to others of the several instances of the single tier inventory component, each of the other instances of the single tier inventory component corresponding to a different local inventory cache; and,
requesting inventory operations from the corresponding instance of the single tier inventory component on a different local inventory cache for a different corresponding one of the others of the several instances of the tier inventory component through invocations of different programmatic functions of an API for the different local inventory cache exposed by the others of the several instances of the tier inventory component.

10. The method of claim 9, further comprising propagating changes in the local inventory cache to another local inventory cache.

11. The method of claim 9, wherein requesting inventory operations on a different local inventory cache comprises requesting an inventory lookup on a different local inventory cache through a programmatic function of an API for the different local inventory cache.

12. The method of claim 9, wherein requesting inventory operations on a different local inventory cache comprises requesting an inventory reservation on a different local inventory cache through a programmatic function of an API for the different local inventory cache.

13. A computer program product comprising a computer usable storage medium comprising a device embodying computer usable program code for multi-tier inventory management, the computer program product including:
computer usable program code for priming a local inventory cache for a corresponding instance from among several instances of a single tier inventory component, with a subset of inventory data for an enterprise data processing system;
computer usable program code for exposing different programmatic functions of an inventory management application programming interface (API) for the primed local inventory cache to others of the several instances of the single tier inventory component, each of the other instances of the single tier inventory component corresponding to a different local inventory cache; and,
computer usable program code for requesting inventory operations from the corresponding instance of the single tier inventory component on a different local inventory cache for a different corresponding one of the others of the several instances of the tier inventory component through invocations of different programmatic functions of an API for the different local inventory cache exposed by the others of the several instances of the tier inventory component.

14. The computer program product of claim 13, further comprising computer usable program code for propagating changes in the local inventory cache to another local inventory cache.

15. The computer program product of claim 13, wherein the computer usable program code for requesting inventory operations on a different local inventory cache comprises computer usable program code for requesting an inventory lookup on a different local inventory cache through a programmatic function of an API for the different local inventory cache.

16. The computer program product of claim 13, wherein the computer usable program code for requesting inventory operations on a different local inventory cache comprises computer usable program code for requesting an inventory reservation on a different local inventory cache through a programmatic function of an API for the different local inventory cache.

* * * * *